United States Patent Office 3,368,985
Patented Feb. 13, 1968

3,368,985
POLYURETHANES PRODUCED FROM HYDROXYL-TERMINATED CARBAMATES
Marco Wismer, Gibsonia, James F. Foote, Sarver, and Paul R. Mosso, Natrona Heights, Pa., assignors to Pittsburgh Plate Glass Company, Pittsburgh, Pa., a corporation of Pennsylvania
No Drawing. Filed Mar. 19, 1965, Ser. No. 441,289
5 Claims. (Cl. 260—2.5)

This invention relates to novel hydroxyl-terminated resins containing a carbamate group, at least one nitrogen atom in addition to the carbamate nitrogen and having an average minimum molecular weight of about 144. Moreover, this invention relates to novel polyurethane resins and particularly novel polyurethane foams prepared from novel hydroxyl-terminated carbamates.

More particularly, this invention pertains to the preparation of novel hydroxyl-terminated carbamates from a urea-type compound, for example, urea, thiourea, or derivatives thereof such as the carbamate reaction product of urea and a trialkanolamine, by reaction with an alkylene oxide having 2 to 10 carbon atoms, and preferably 2 to 4 carbon atoms. Even more specifically, this invention pertains to the preparation of novel rigid polyurethane foams by the reaction of an organic polyisocyanate and the hydroxyl-terminated reaction product of a urea-type compound, preferably urea, and an alkylene oxide having 2 to 4 carbon atoms, preferably propylene oxide or butylene oxide, wherein the ratio of alkylene oxide to urea is preferably from about 2 to 1 to about 10 to 1.

The novel hydroxyl-terminated resins of this invention, which may be formed by reaction of urea-type compounds with an alkylene oxide, contain carbamate groups and amino groups, and possess compounds of the following structure, generally in amounts of greater than about 20 percent by weight:

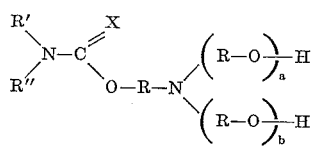

wherein X is a chalcogen atom occurring in one of the short periods of the periodic table, that is, an oxygen or sulfur atom, each R is a 1,2-alkylene radical of 2 to 10 carbon atoms, preferably 2 to 4 carbon atoms, R' and R" are hydrogen, lower alkyl, especially lower alkyl groups having 1 to 4 carbon atoms, aryl, especially phenyl, lower alkylphenyl, especially alkylphenyl groups of 7 to 11 carbon atoms, and

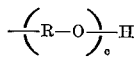

groups, where R may be the same or different, wherein R' and R" may be the same or different, and $a$, $b$ or $c$ is a number from 0 to 10, with $a+b+c$ equal to 1 to 10.

Although compounds of the above structure are believed to be predominant in the novel resins of this invention, there is evidence also of the presence of carbonates of the following structure:

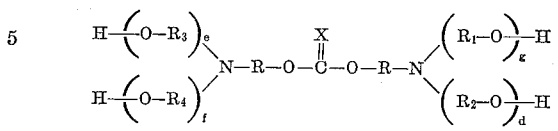

wherein X and R have the significance set forth above, $R_1$, $R_2$, $R_3$ and $R_4$ are each an alkylene group of 2 to 10 carbon atoms, usually a lower alkylene group of 2 to 4 carbon atoms, and particularly a 1,2-lower alkylene group, wherein $R_1$, $R_2$, $R_3$ and $R_4$ are generally the same, but may be different, and $d$, $e$, $f$ and $g$ are numbers from 0 to 10, with the sum of $d+e+f+g$ being a maximum of 20.

Hydroxyl-containing resins have widespread industrial importance in the preparation of detergents, surfactants, polyester resins and polyurethane resins. Of the numerous hydroxyl-containing resins presently available for utilization in the preparation of polyurethane resins, one common deficiency exists, namely, that polyurethane resins prepared therefrom do not resist burning unless considerable quantities of phosphorus and/or chlorine-containing materials are included in the formulation. Although phosphorus or halogen-containing additives produce fire retardant polyurethane resins, they frequently detract from other desirable properties of the polyurethane material.

However, it has now been discovered that novel hydroxyl-containing resins prepared from an alkylene oxide and a urea-type compound, or carbamate derivative thereof, surprisingly yield a flame retardant polyurethane resin when reacted with an organic polyisocyanate. This is particularly surprising inasmuch as other nitrogen-containing polyols, such as N,N,N¹,N¹-tetrakis(2-hydroxypropyl)ethylene diamine do not impart flame retardant properties to polyurethane resins.

As indicated above, these novel resins are prepared by reaction of an alkylene oxide having 2 to 10 carbon atoms, preferably 2 to 4 carbon atoms, with a urea-type compound, for example, urea, thiourea, and the like, or carbamate derivatives such as those prepared by reaction of a trialkanolamine with urea, thiourea, or a substituted urea. To produce such carbamates, the preferred molar ratio of trialkanolamine to urea is less than about 2:1, with an approximately equimolar ratio being especially preferred, although at higher ratios some carbamate formation is present. Suitable trialkanolamines include triethanolamine, triisopropanolamine, tris(2-hydroxybutylene)amine, and the like.

The invention may also be expressed as the resinous reaction product of an alkylene oxide and an organic material containing compounds of the formula:

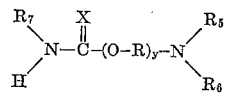

wherein X and R have the significance set forth above, wherein $y$ is a whole number from 0 to 1, and $R_5$ and $R_6$ are hydrogen and $R_7$ may be an alkyl or aryl group when $y$ is 0, wherein $R_5$, $R_6$ and $R_7$ are otherwise each selected from the class consisting of hydrogen and lower organic hydrocarbon groups having reactive hydrogens, especially lower aliphatic groups having reactive hydrogens, and particularly hydroxy-alkyl groups wherein the alkyl group is a lower alkyl group, especially of 2 to 4 carbon atoms, such as hydroxypropyl groups, and wherein $R_5$, $R_6$ and $R_7$ may be the same or different. When $y=1$ and $R_7$ is something other than hydrogen, compounds of the above formula are typically called urethanes; however, for purposes of this invention, they are referred to as carbamates inasmuch as these are considered to be N-substituted carbamates.

It is significant that these resins can be successfully utilized without removing carbonates of the above structure or free urea, which may be present in quantities up to about 20 percent by weight, although the free urea content is preferably less than about 10 percent by weight of the resin.

It is especially significant that the inclusion of even minor quantities of the hydroxyl-terminated, nitrogen-containing resins of this invention in conventional polyurethane foam formulations contribute fire retardancy to the resulting foam, and, when major quantities of these novel materials are included in polyurethane foam formulations, the resulting foams are self-extinguishing by the standard set forth in ASTM D–1962–59T.

While the most surprising property of the novel polyurethane resins of this invention is their resistance to burning, it is also significant that they are very resistant to water vapor transmission and to oxygen transmission, and that rigid foams formed of these novel polyurethane resins have excellent resistance to heat transfer which is minimally varied by aging of the foam.

A further significant contribution of the instant invention resides in the catalytic properties which the novel hydroxyl-terminated carbamates exhibit in promoting the reaction of its reactive hydrogens with isocyanato groups. This property is especially useful in the preparation of novel polyurethane resins inasmuch as these novel carbamates effectively and rapidly promote the polymerization of the reactants in the substantial absence, and often in the complete absence, of the expensive catalysts conventionally utilized to promote the urethane reaction.

Of the urea compounds useful in the preparation of the novel urea-alkylene oxide reaction products of this invention, urea

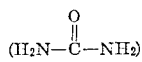

is prefered. For the purposes of this invention, however, "a urea" may be defined as a compound having at least three reactive hydrogens attached to urea nitrogens. Such ureas may be represented by the following formula:

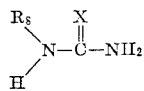

wherein X is a chalcogen atom occurring in one of the short periods of the periodic table, that is, an oxygen or sulfur atom, preferably oxygen, $R_8$ is hydrogen, lower alkyl, especially lower alkyl groups having 1 to 4 carbon atoms, hydroxyalkyl groups wherein the alkyl group contains 1 to 4 carbon atoms, aryl, especially phenyl and lower alkyl phenyl groups, and aralkyl, e.g., benzyl. Substituted ureas include:

Methyl urea
Ethyl urea
Butyl urea
Hydroxymethyl urea
Hydroxypropyl urea
Phenyl urea
Benzyl urea and the like.

The alkylene oxide reactants useful in this invention include alkylene oxides having 2 to 10 carbon atoms, wherein the alkylene oxide contains an oxirane

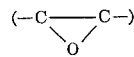

group. The preferred alkylene oxides are ethylene oxide, 1,2-propylene oxide and 1,2-butylene oxide. When rigid polyurethane foams are prepared with halocarbon cellulating agents, then propylene oxide and butylene oxide are preferably utilized.

The reaction of a urea of the type illustrated above and an alkylene oxide may be depicted structurally as follows, wherein propylene oxide is shown as a typical alkylene oxide:

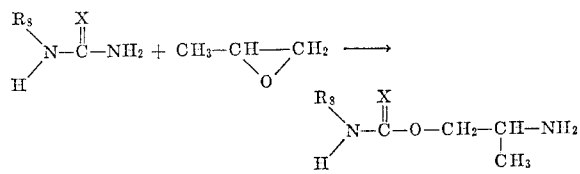

wherein $R_8$ and X have the significance set forth above. Additional moles of propylene oxide may be added to the active hydrogens attached to the nitrogen atoms.

It is generally preferred that at least about 2 moles of alkylene oxide be reacted with each mole of a urea to produce the novel resins of this invention. The maximum molar ratio of alkylene oxide to urea is about 20 to 1; however, it is generally preferred that the maximum ratio be about 10 to 1. In this regard, it is significant that when the ratio is about 4 to 1 or less, there are few, if any, ether groups present in the resin.

The novel hydroxyl-terminated reaction products of a urea-type compound or carbamate derivtive thereof, and an alkylene oxide, characterized by the presence of carbamate and amino groups and some carbonate groups, can be prepared by reaction of the components under substantially anhydrous conditions or, alternatively, in an aqueous or solvent medium. When the reaction is carried out under anhydrous conditions, it is generally desirable to heat the urea component until it is in a liquid state before adding the alkylene oxide reactant. However, when propylene oxide or other higher molecular weight oxides are to be utilized, the urea may be solubilized in the liquid alkylene oxide. The reaction is generally carried out at temperatures of about 200° F. to about 300° F., although lower or higher temperatures may be utilized if desired, for example, from 100° F. to about 500° F. The reaction is ordinarily carried out under superatmospheric pressure which is generally maintained in the range of about 50 to 150 pounds per square inch gauge, although lower or higher pressures may also be employed, for example, from about 10 to about 300 pounds per square inch gauge.

The reaction of a urea and an alkylene oxide may be conducted in an aqueous medium by dissolving the urea in water. The reaction is controlled by the addition of the alkylene oxide reactant. The temperature and pressure conditions are substantially as set forth above. However, the reaction may also be conducted in two stages when an aqueous medium is utilized. The reaction is allowed to proceed until the urea-alkylene oxide adduct is liquid at the reaction conditions. The water is then removed before the oxyalkylation reaction is continued. This procedure diminishes the presence of undesirable side products, such as propylene glycol and the like.

The reaction of a urea with an alkylene oxide is preferably conducted in the absence of a catalyst, however, either acidic or basic catalysts may be utilized. Suitable acidic catalysts include the mineral acids, such as sulfuric acid, hydrochloric acid, nitric acid, phosphoric acid, and the like. The basic catalysts include the hydroxides of alkaline metals and alkaline earth metals, such as lithium hydroxide, sodium hydroxide, potassium hydroxide, calcium hydroxide, barium hydroxide, and the like. If it is desired to produce a product having a molar ratio of greater than 4 to 1 of alkylene oxide to urea, then it is preferred to utilize a catalyst after the first 4 moles of alkylene oxide have been added to the urea.

While the above-described methods of preparation of the novel urea-alkylene oxide reaction products of this invention are preferred, the reaction may also be conducted by dissolving the urea component in a suitable polyol, polyether polyol, hydroxyl or carboxyl-terminated polyesters, or in an inert solvent which does not react with the alkylene oxide and is capable of being removed after the reaction. Suitable polyols, polyether polyols and polyesters are set forth below.

The novel hydroxyl-terminated reaction products of this invention are characterized by a carbamate group which can be determined by a combination of infrared analysis and nuclear magnetic resonance spectroscopy, and an amino group which can be determined by conventional titration procedures, such as that described at page 105 of Quantitative Organic Analysis Via Functional Groups, by Siggia, John Wiley and Sons (Second Edition, 1954). The infrared analysis indicates the presence of carbonyl groups which are not urea carbonyls, while the nuclear magnetic resonance analysis indicates the presence of amide and substituted amide groups.

The novel hydroxyl-terminated resins of this invention are exceptionally useful in the preparation of rigid polyurethane foams by reaction with an organic polysiocyanate, however, they are also useful in the preparation of polyurethane coatings, polyester resins, and in detergents. The rigid polyurethane foams prepared from the novel hydroxyl-terminated polymers of this invention are especially useful for insulation applications in that they possess excellent resistance to heat transfer, good resistance to moisture permeation, and good dimensional stability.

Rigid polyurethane foams prepared from conventional polyols, such as sorbitol, alpha-methyl glucoside, and the like, having densities of about 2 pounds per cubic foot and less, have water vapor permeation values in the range of about 6 perms per inch of foam thickness to about 9 perms per inch. The perm is defined in ASTM–E–96 as the water vapor transmission rate per inch of mercury difference in vapor pressure. The units for a perm are:

$$\frac{\text{Grains of water transmitted}}{\text{hr—square feet of surface—inches of Hg differential in vapor pressure}}$$

The novel rigid polyurethane foams prepared from an organic polyisocyanate and the novel hydroxyl-terminated resins of this invention have water vapor permeation values as low as about 2 perms per inch for comparable foam densities.

A further desirable property of the novel polyurethane foams prepared from the hydroxyl-terminated urea-alkylene oxide adducts of this invention resides in their excellent compatibility with the halocarbons widely utilized as blowing agents in polyurethane foams. This is especially true when propylene oxide or butylene oxide is used to prepare the novel urea-alkylene oxide adducts. This excellent compatibility with halocarbons is important in that it permits the preparation of rigid polyurethane foams having densities as low as about 1.2 pounds per cubic foot which retain, to a great degree, the outstanding physical properties of the more dense foams. This is advantageous inasmuch as rigid polyurethane foams derived from conventional polyether polyols cannot be prepared with densities of less than about 2 pounds per cubic foot without deleteriously affecting the physical properties of the foam.

Novel polyurethane resins may be prepared from the novel hydroxyl-terminated urea-alkylene oxide products described above by the reaction of approximately one equivalent of the hydroxyl-terminated resin with one equivalent of an organic polyisocyanate. While the hydroxyl-terminated urea-alkylene oxide reaction products tend to promote the urethane reaction, on occasion it may be desirable to include a small amount of a suitable urethane catalyst. Also ordinarily included in foam formulations are suitable emulsifiers.

Organic polyisocyanates which are reactive with the novel urea-alkylene oxide reaction products of this invention to form novel polyurethane resins include the following:

Tolylene diisocyanate
Chlorophenyl-2,4-diisocyanate
Ethylene diisocyanate
1,4-tetramethylene diisocyanate
Para-phenylene diisocyanate
Hexamethylene diisocyanate and the like. While the above diisocyanates may be reacted with the novel alkylene oxide-urea reaction products to form coatings or foams, it is preferred to form prepolymers of said diisocyanates when they are to be used in rigid foam formulations.

When it is desired to form polyurethane foams directly from an organic polyisocyanate and the novel resins of this invention without first preparing a prepolymer, it is preferred that poly-nuclear polyisocyanates of the following type be included:

Diphenyl diisocyanate
Triphenyl diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate
Triphenylmethane triisocyanate
1,5-naphthalene diisocyanate
3,3'-dimethyldiphenylmethane-4,4'-diisocyanate and the like. Of the preferred polyisocyanates, it has been found that the best results have been obtained when the polymeric polyisocyanates having a functionality greater than 2.0 are utilized. Exemplary polymeric polyisocyanates including the following:

Crude diphenylmethane - 4,4' - diisocyanate, commonly referred to as crude MDI, having a functionality of about 2.5 to 2.6. Furthermore, although solid organic polyisocyanates can be utilized in the instant invention by melting them prior to reaction with the other foam-forming ingredients, it is preferred that liquid organic polyisocyanates be utilized.

Another organic polyisocyanate particularly useful is crude tolylene diisocyanate, commonly referred to as crude TDI, containing about 85 percent TDI and about 15 percent polymeric isocyanate and having a functionality of about 2.1.

Polymethylenepolyphenyl isocyanate, referred to as PAPI, having an isocyanate functionality greater than about 2.4, has been found to be particularly useful.

The relative amount of organic polyisocyanate utilized in polyurethane foam formulations is susceptible of variation over a substantial range. Usually, the isocyanate component is employed in an amount which provides approximately one reactive isocyanato group for each reactive hydrogen of the other component, which is conventionally a polyol, polyamine or similar reactive hydrogen-containing material. However, some of the organic polyisocyanates tend to evaporate and it may be desirable to compensate for this loss. A range of about ½ equivalent to about 2 equivalents of organic polyisocyanate per equivalent of polyol component in the final material is ordinarily used, but smaller or larger amounts can be utilized with good results.

While useful polyurethane resins are formed by the reaction of an organic polyisocyanate and the novel urea-alkylene oxide reaction products of this invention, it has been found that other reactive hydrogen-containing components such as various long chain aliphatic polyols, polyether polyols, polyester polyols, and the like, may be included without substantially detracting from the excellent properties of the polyurethane resins of this invention. In some cases, it has been found that inclusion of another reactive hydrogen-containing component has resulted in improvements in certain of the properties of polyurethane foams formed from an organic polyisocyanate and the novel hydroxyl-containing resins of this invention, for example, improved surface characteristics have been obtained.

Aliphatic polyols useful in this invention include those diols which are separated by a carbon chain of 6 to 20 or more carbon atoms. Since such diols are only difunctional, they are ordinarily included only as minor amounts as a reactant in foam formulations designed to produce the novel rigid foams of this invention. For purposes of this invention, minor amounts of aliphatic diols may be defined as amounts which do not detract from the rigidity of the cured foam nor detract from the excellent dimensional stability of the foam.

Aliphatic triols such as hexanetriol and polyether polyols prepared by the oxyalkylation of said aliphatic triols, may be used in minor or major quantities in the foam formulation of this invention. It is preferred, however, that additional reactive hydrogen components be more than trifunctional and that the trifunctional polyols and polyether polyols be used in relatively minor quantities. The aliphatic triols which may be included as an additional reactive hydrogen component include aliphatic triols having 6 or more carbon atoms. Typical triols include the following:

Trimethylolethane
Trimethylolpropane
Glycerol
1,2,6-hexanetriol and the like. The trifunctional polyether polyols useful in the preparation of rigid polyurethane foams have a hydroxyl number in excess of about 200 and preferably should have a hydroxyl number in excess of about 300.

Tetrafunctional polyether polyols and polyether polyols of higher functionality are prepared by the reaction of an alkylene oxide, such as ethylene oxide, propylene oxide or butylene oxide, with a polyol having 4 or more available hydroxyl groups. Typical tetrafunctional and higher functional polyether polyols are prepared by the oxyalkylation of polyols such as the following:

Pentaerythritol
Sucrose
2,2,6,6-tetrakis(hydroxymethyl)cyclohexanol
Glucose
Sorbitan
Mannitan
Degraded starches
Degraded cellulose
Diglycerol
Alpha-methyl glucoside and the like. When such polyether polyols are utilized in the novel rigid polyurethane foams of this invention, they should have a hydroxyl number in excess of about 200 and preferably in excess of about 250, with the best results ordinarily being achieved from those polyether polyols having hydroxyl numbers in excess of about 300.

In addition to the aliphatic polyols and the polyether polyols, polyester resins containing hydroxyl groups may be utilized in conjunction with the novel hydroxyl-terminated urea-alkylene oxide reaction products to prepare useful rigid polyurethane foams. Suitable polyester resins may be prepared by reacting an excess of polyol with a polycarboxylic acid, especially dicarboxylic acids. Typical polyols include:

Ethylene glycol
Propylene glycol
Butylene glycol
Glycerol
Trimethylolpropane
Trimethylolethane
1,2,6-hexanetriol
Pentaerythritol
Diethylene glycol
Dipropylene glycol and the like. Typical dicarboxylic acids include:

Adipic acid
Succinic acid
Azaleic acid
Phthalic acid
Isophthalic acid
Terephthalic acid and the like, and the corresponding anhydrides where such anhydrides exist. Also, long chain dimer acids may be used to form useful polyols by esterification with polyols, especially diols such as ethylene glycol and the like. For the purposes of this invention, useful polyesters should have a minimum hydroxyl number of about 200, and preferably above about 250, with best results being obtained from those polyesters having hydroxyl numbers in excess of about 300.

Other active hydrogen-containing materials which may be present in the novel urethane foams of this invention include phenol-formaldehyde condensation products, aminic compounds such as diethanolamine, triethanolamine, diethylenetriamine, 1,6-hexamethylene diamine, and the like, as well as oxyalkylation products of these active hydrogen-containing materials and aliphatic polyamines, such as N,N,N',N'-tetrakis(2-hydroxypropyl)ethylene diamine. Another material which may be present in the foams of this invention is castor oil and its derivatives. Also useful are the oxyalkylation products of polyamine polyamide compounds as obtained by the reaction of dicarboxylic acids with polyamines.

For a more complete understanding of available raw materials for the manufacture of polyurethane resins, especially polyurethane foams, and methods of preparing these raw materials, reference may be had to Polyurethanes: Chemistry and Technology, Volume I, by Saunders and Frisch, Interscience Publishing Company (1962), especially pages 17 through 54, inclusive.

In addition to the reactive hydrogen-containing components listed above, it has been found that the inclusion of water in rigid foam formulations based upon the novel urea-alkylene oxide reaction products disclosed herein, may give certain beneficial effects. Water, of course, will promote cellulation by reaction with isocyanato groups to produce carbon dioxide, however, in addition to causing cellulation, it has been found to improve to some extent the dimensional stability of certain rigid polyurethane foams produced according to the teaching of this invention.

To promote the polyurethane linkage reactions in the final curing of the polyurethane resins, catalysts are usually required. These include tertiary amines of hydroxyl amines, organic salts of tin, and the like. The following constitutes a partial list of such catalysts.

Tetramethylethylenediamine (anhydrous) (TMEDA)
Tetramethyl guanidine (TMG)
Tetramethyl-1,3-butanediamine (TMBDA)
Triethylenediamine of the formula:

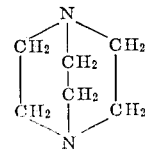

Dimethylethanolamine (DMEA)

Tin esters, such as:
   Stannous oleate
   Stannous octoate
   Dibutyl tin dilaurate
and the like.

Many other catalysts may be substituted for those listed above, if desired. The amount of catalyst used may be in a range of about 0.05 percent to about 5 percent or more by weight based upon the total of the polyols employed. Mixtures of the above and/or other catalysts may also be utilized.

To impart a foamed or cellular structure to the blended polyol-polyisocyanate mixture, a suitable gassing agent or system of gassing agents must be added or produced in situ. The liquid but relatively volatile halocarbons, such as the following perhalocarbons containing 1, 2, or even up to 4 carbon atoms, are especially desirable for the purpose. These include the following:

| | |
|---|---|
| $CCl_3F$ | $CHCl_2F$ |
| $CCl_2F_2$ | $CClF_3$ |
| $C_2Cl_2F_4$ | $CHClF_2$ |

The halocarbons having 1 and 2 carbon atoms are preferred, and of these, trichloromonofluoromethane and dichlorodifluoromethane are particularly useful in commercial preparations. These are added as liquids in quantities of about 10 percent or less to about 20 percent or more, by weight of the total resin to the blended polyol-polyisocyanate mixtures, or to one or more components thereof, and are substantially volatilized in the liquid mixture to effect cellation. Subsequently, the mixture cures to a hardened, cellular state.

Although the halocarbons are especially desirable as blowing agents when exceptional insulative properties are desired, other blowing agents, such as water, carbon dioxide, and the like, can be utilized in this invention.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication Detergents and Emulsifiers—Up to Date 1960, published by John W. McCutcheon, Inc., 475 Fifth Avenue, New York, N.Y.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are ascribed the structure:

$$HO(C_2H_4O)_j(C_3H_6O)_k(C_2H_4O)_lH$$

Another class of surfactants comprises the so-called Tetronics, which are formed by the addition of propylene oxide to ethylene diamine, followed by the addition of ethylene oxide. These compounds have been ascribed the structure:

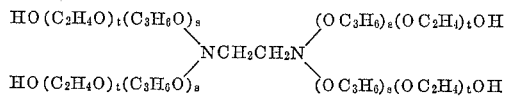

Another valuable class of surfactants comprises the so-called Tweens, which are described as the monoesters of higher fatty acids, represented by lauric acid, stearic acid and oleic acid, and polyoxyethylene sorbitan.

Another of the more satisfactory surfactants which has been found very effectively to maintain the cell structure in the foaming and curing of polyurethane resins comprises soluble, liquid derivatives of the silicones. One such product is of the approximate structure:

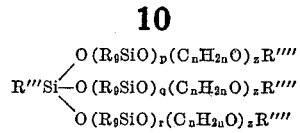

in which $R'''$ and $R''''$ are monovalent hydrocarbon radicals, while $R_9$ is a divalent hydrocarbon radical; $p$, $q$ and $r$ are integers equal to at least 1 and may be considerably higher, e.g., 2, 3, 4, 5, 6 or a higher number up to about 20; $n$ is a whole number from about 2 to about 4; and $z$ is an integer equal to at least 5 and may be higher, e.g., 6, 7, 8, 9, 10 or even higher, up to about 25. One such material is sold as Dow Corning-199. Still another highly useful silicon base surfactant comprises the so-called silicon L-521, represented by the following formula:

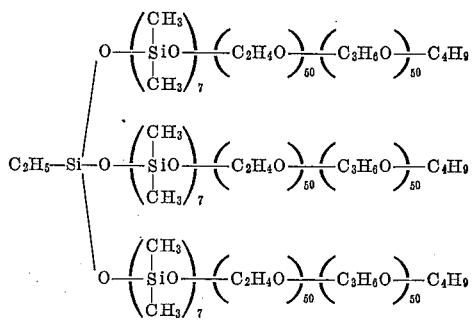

Other surfactants, especially the liquid or soluble non-ionic ones, are also useful. The surfactants may be employed in amounts within a range of about 0.1 to about 3 percent by weight based upon the mixture of polyol component and the organic polyisocyanate component. In relatively dense foams, for example, those weighing about 5 or 6 pounds and upward per cubic foot, the surfactants may be omitted entirely.

The following examples illustrate in detail the preparation of the novel polyhydroxy resins and polyurethane foams thereof of this invention, but the invention is not to be contrued as being limited solely thereto.

EXAMPLE I

*Urea-propylene oxide reaction*

About 8.0 gram moles (480.1 grams) of urea and 32.0 gram moles (1856 grams) of propylene oxide were reacted in the presence of 2.4 grams of potassium hydroxide.

The urea and potassium hydroxide were charged to an autoclave having external heating means. About 600 grams of propylene oxide were added and the temperature was gradually raised to about 240° F. Because of the exothermic reaction from this 600-gram portion of the propylene oxide, the maximum pressure attained was 230 pounds per square inch gauge and the maximum temperature reached was 310° F. When the pressure of the reaction vessel had dropped to 70 pounds per square inch gauge, the remaining amount of oxide was added intermittently over about a 5-hour period. During the addition of the remaining portion of the propylene oxide, the autoclave pressure was maintained at about 70 pounds per square inch gauge and the temperature was maintained at about 260° F.

After all of the propylene oxide reactant had been added, the temperature of the autoclave was maintained at about 260° F. for about 1 hour. At this point, the autoclave pressure had diminished to about 28 pounds per square inch gauge, indicating that the reaction was nearing completion. After allowing the reaction to go to completion, the contents of the reaction vessel were removed.

The reaction product had a hydroxyl number of 626.6.

EXAMPLE II

*Reaction of 1 mole of urea with 4 moles of propylene oxide and foams thereof*

A urea-propylene oxide polyol was prepared from the following materials:

|  | Moles | Grams |
|---|---|---|
| Urea | 8.0 | 480 |
| Propylene oxide | 32.0 | 1856 |

About 600 grams of the propylene oxide, the urea, and about 2.4 grams of 85 percent potassium hydroxide were charged to an autoclave having external heating means. The reaction vessel temperature was gradually raised over a 30-minute period to about 250° F. At this temperature, the pressure was about 140 pounds per square inch gauge and the reaction was observed to be in the initial stages of an exothermic reaction. The pressure of the reaction vessel reached about 215 pounds per square inch gauge and the maximum temperature attained was about 295° F. The reactor contents were maintained at a temperature of about 245° F. to about 260° F. and the pressure was gradually reduced to about 70 pounds per square inch gauge and was maintained thereby the intermittent addition of the remaining propylene oxide over a period of about 3 hours. When the autoclave pressure had reduced to 0 pounds per square inch gauge, the reaction product was recovered.

The crude reaction product had a viscosity of 1130 centipoises, a hydroxyl number of 639.2, and a nitrogen content of 9.33 percent.

Part of the crude product was distilled under vacuum at a temperature of 120° C. (maximum) and in the presence of about 0.1 percent by weight of 85 percent phosphoric acid. The purified product contained in the distillation vessel was recovered and filtered. The purified reaction product had a hydroxyl value of 646.4, a Brookfield viscosity at 77° F. of 1298 centipoises, a water content of 0.11 percent by weight, and an acid value of 0.20.

Foams were prepared of the crude reaction product and of the purified reaction product with Nacconate 4040 and PAPI. The foam formulations and properties are contained in Table 1.

EXAMPLE II.—TABLE 1

| Material | Foam II-A | Foam II-B | Foam II-C | Foam II-D | Foam II-E |
|---|---|---|---|---|---|
| Nacconate 4040 [1] | 100.0 grams | 100.0 grams | 100.0 grams | 100.0 grams | 105.0 grams. |
| PAPI [2] | | | 65.0 grams | | 47.0 grams. |
| Purified urea-propylene oxide polyol (OH—646) | 80.0 grams | | 66.0 grams | | 45.0 grams. |
| Crude urea-propylene oxide polyol (OH—639) | | 81.0 grams | | | |
| Phosphorus polyol [3] | 1.0 gram | 1.0 gram | 1.0 gram | 1.0 gram | 1.0 gram. |
| Silicone emulsifier | 1.5 milliliters | 1.5 milliliters | 0.4 milliliter | 0.4 milliliter | 0.6 milliliter. |
| 1.0 DMEA/0.4 DABCO (triethylenediamine) | 30.0 grams | 30.0 grams | 25.0 grams | 25.0 grams | 31.0 grams. |
| Tetramethylbutanediamine | | | | | |
| Trichloromonofluoromethane | 7 seconds | 7 seconds | 10 seconds | 10 seconds | 10 seconds. |
| Mixing time at 850 r.p.m | 9 seconds | 9 seconds | 27 seconds | 27 seconds | 38 seconds. |
| Cream time [4] | 35 seconds | 34 seconds | 76 seconds | 74 seconds | 110 seconds. |
| Set time | Very good | Very good | Very good | Very good | Very good. |
| Foam appearance | Fine | Fine | Fine | Fine | Fine. |
| Cell structure | Extremely friable inside and skin. | Extremely friable inside and skin. | Friable skin non-friable inside. | Friable skin non-friable inside. | Friable inside and skin. |
| 1 hour cure at room temperature | Good | Good | Good | Good | Good. |
| Compatibility of premix and isocyanates | Very weak | Very weak | Fair | Fair | Weak. |
| Interior foam strength, 2 hours cure at room temperature. | | | | | |
| Primary shrinkage after 1 hour room temperature cure. | None | None | None | None | Slight. |

[1] Nacconate 4040—A crude isocyanate composition having a functionality of 2.1 and containing approximately equal parts of 2,4-isomer and 2,6-isomer of TDI and about 15 percent by weight of polymeric isocyanate materials.
[2] PAPI—Polymethylene polyphenyl isocyanate, functionality of above about 2.4.
[3] Monoisobutyl phosphates and diisobutyl phosphates reacted with propylene oxide to a hydroxyl number of about 260.
[4] Cream time is the term used to designate the length of time required for a resin to begin cellulation, as determined from initial mixing.

Foams II–C and II–D were the best foams of the foams prepared in Table 1 of Example II. Foam II–C had a density of 1.83 pounds per cubic foot and a water vapor transmission value of 2.40 perms per inch. Foam II–D had a density of 1.86 pounds per cubic foot and a water vapor transmission value of 2.32 perms per inch. The resistance to expansion and distortion of these foams was tested at high temperature and high humidity conditions. The results of these distortion tests are shown in the following table:

EXAMPLE II.—TABLE 2

| Test Conditions | Foam II-C | Foam II-D |
|---|---|---|
| 200° F. for 48 hours | 0 and 1 percent expansion, very slight distortion. | 0 and 1 percent expansion, very slight distortion. |
| 200° F. for 1 week | do | Do. |
| 200° F. for 2 weeks | 0 and 0.8 percent expansion, very slight distortion. | 0 and 0.8 percent expansion, very slight distortion. |
| 158° F., 100 percent relative humidity for 24 hours. | 0 and 0.8 percent expansion, no distortion. | 0 percent expansion, no distortion. |
| 158° F., 100 percent relative humidity for 1 week. | 0 and 2 percent expansion, very slight distortion. | 0 and 2 percent expansion, very slight distortion. |
| 158° F., 100 percent relative humidity for 2 weeks. | 1.2 and 1.2 percent expansion, very light distortion. | 0.8 and 1.6 percent expansion, very slight distortion. |
| 158° F., 100 percent relative humidity for 4 weeks. | 1.5 and 2 percent expansion, very slight distortion. | 1.5 and 1.5 percent expansion, very slight distortion |

Foams II–C and II–D were observed to have improved properties after 6 days of room temperature curing. After this additional curing period, the foams had skin surfaces which were only slightly friable and the interior foam cells were tough and strong.

To determine the utility of the urea-propylene oxide polyols of the instant invention with conventional polyols, foams were prepared from a blend of the crude urea-propylene oxide polyol prepared above (Example II) and a sucrose polyether polyol prepared by reacting 1 mole of sucrose with 12.3 moles of propylene oxide and 4 moles of ethylene oxide, and having a hydroxyl number of 406. The results of this experiment are tabulated in Table 3.

EXAMPLE II.—TABLE 3

| Material | Foam II-F | Foam II-G |
| --- | --- | --- |
| Nacconate 4040 | 100 grams | 100 grams. |
| Sucrose polyol | 107.0 grams | 95.0 grams. |
| Crude urea-propylene oxide polyol (OH—639) | 13.0 grams | 20.0 grams. |
| Silicone emulsifier | 1.0 gram | 1.0 gram. |
| 1.8 DMEA/0.1 DABCO | 1.9 milliliters | 1.9 milliliters. |
| Trichloromonofluoromethane | 42.5 grams | 41.5 grams. |
| Mixing time at 850 r.p.m | 12 seconds | 11 seconds. |
| Cream time | 17 seconds | 14–15 seconds. |
| Set time | 82 seconds | 70 seconds. |
| Remarks | Foam had good appearance and was not friable. Foam had fine cells and was fairly strong. | The foam had a good appearance and had only very slight surface friability. The foam had fine cells and was fairly strong, although not quite as strong as foam II-F. |

Foams II-F and II-G had densities, respectively, of 1.55 pounds per cubic foot and 1.50 pounds per cubic foot. These foams were subjected to high temperatures and high humidity conditions to test the expansion and distortion resistance. These results are tabulated in Table 4 below.

EXAMPLE II.—TABLE 4

| Test Conditions | Foam II-F | Foam II-G |
| --- | --- | --- |
| 200° F. for 48 hours | 1 and 2 percent expansion, slight distortion. | 2 and 2 percent expansion, slight distortion. |
| 200° F. for 1 week | 2 and 4 percent expansion, slight distortion. | 2 and 4 percent expansion, slight distortion. |
| 158° F., 100 percent relative humidity for 24 hours. | 0 and 2 percent expansion, slight distortion. | 0 and 2 percent expansion, slight distortion. |
| 158° F., 100 percent relative humidity for 1 week. | 2 and 4 percent expansion, slight distortion. | 1.5 and 2 percent expansion, slight distortion. |
| 158° F., 100 percent relative humidity for 2 weeks. | 6 and 6 percent expansion, slight distortion. | 4 and 5 percent expansion, slight distortion. |

It was observed that the foams prepared from a blend of a urea-propylene oxide polyol and a sucrose polyether polyol had better surface characteristics than the foams prepared solely from urea-propylene oxide polyols. In those applications in which surface friability would be undesirable, the foams II-F and II-G woud be preferred. However, the inclusion of a sucrose polyether polyol appeared to detract from the expansion and distortion resistance of the foams when subjected to high temperature and high humidity conditions. Thus, for applications where the foams would be subjected to high temperatures and high humidity conditions, the foams prepared from a urea-propylene oxide polyol would be preferred.

EXAMPLE III

*Reaction of 1 mole of urea with 6 moles of propylene oxide*

A hydroxyl-terminated carbamate polyol was prepared from the following ingredients:

|  | Moles | Grams |
| --- | --- | --- |
| Urea | 6.0 | 360 |
| Propylene oxide | 36.0 | 2080 |

The urea, 450 grams of propylene oxide and 2.12 grams of 85 percent potassium hydroxide were charged to an autoclave having external heating means. The reaction mixture was agitated and the temperature was raised gradually to about 300° F., at which time the maximum pressure of 170 pounds per square inch gauge was achieved. The maximum temperature reached was 305° F. While maintaining the temperature of the reaction mixture at about 250° F., the pressure was allowed to reduce to about 70 pounds per square inch gauge. The pressure was then maintained at about 70 pounds per square inch gauge by the incremental addition of propylene oxide. The propylene oxide addition required about 5 hours. The pressure of the autoclave was allowed to reduce while maintaining the temperature at about 260° F. Of the 2442 grams charged, about 2270 grams of reaction product were recovered.

The crude reaction product was purified by stripping it of volatile materials by distillation under vacuum in the presence of about 2.2 grams of 85 percent phosphoric acid. The reaction product was heated to about 90° C., at which time vacuum was applied. The reaction product was distilled at a temperature of about 120° C. while maintaining a vacuum of about 15 millimeters of mercury. The reaction product was vacuum distilled for about 1 hour. Of the 2249 grams of material charged, about 2218 grams of purified reaction product were recovered. The purified reaction product had a hydroxyl value of 574.4 and a moisture content of 0.11 percent by weight water.

Several rigid foams were obtained by reacting the purified reaction product with various types of organic polyisocyanates. The proportions of the ingredients utilized and the properties of the resulting foams are tabulated below.

EXAMPLE III.—TABLE 1

| Materials | Foam III-A | Foam III-B | Foam III-C |
|---|---|---|---|
| Nacconate 4040 | 100.0 grams | | |
| Mondur-MR [1] | | 100.0 grams | |
| PAPI | | | 100.0 grams. |
| Purified urea-propylene oxide polyol (OH—574.4) | 95.0 grams | 77.0 grams | 77.0 grams. |
| Silicone emulsifier | 1.0 gram | 1.0 gram | 1.0 gram. |
| 1.8 DMEA/0.1 DABCO | 1.0 milliliter | | |
| TMBDA | | 0.4 milliliter | 0.4 milliliter. |
| Trichloromonofluoromethane | 32.0 grams | 29.0 grams | 29.0 grams. |
| Mixing time at 850 r.p.m | 10 seconds | 10 seconds | 10 seconds. |
| Cream time | 16–17 seconds | 23 seconds | 45 seconds. |
| Set time | 70–80 seconds | 67 seconds | 125 seconds. |
| Properties of foam after curing at room temperature for 15 hours | Extremely friable and weak cell structure. | Very friable and weak cell structure. | Friable and weak cell structure, but better than Foams III-A and III-B. |
| Foam appearance | Good foam appearance with fine cell structure. | Good foam appearance with fine cell structure. | Good foam appearance with fine cell structure. |
| Density, pounds per cubic foot | | 1.68 | 1.66. |

[1] Mondur-MR designated p,p'-diphenylmethane diisocyanate having a functionality of about 2.5 to 2.6.

Additional rigid foams were prepared from the urea-propylene oxide polyol and the polymethylene polyphenyl isocyanate (PAPI) since the best results were obtained with that isocyanate. The proportions of the foam ingredients and the properties of the resulting foams are tabulated below.

EXAMPLE III.—TABLE 2

| Materials | Foam III-D | Foam III-E | Foam III-F | Foam III-G | Foam III-H |
|---|---|---|---|---|---|
| PAPI | 105.0 grams | 105.0 grams | 105.0 grams | 100.0 grams | 100.0 grams. |
| Purified urea-propylene oxide polyol (OH—574.4) | 67.0 grams | 63.0 grams | 58.0 grams | 77.0 grams | 77.0 grams. |
| Phosphorus polyol (OH—260) prepared by reaction of propylene oxide with mixture of mono- and dibutyl acid phosphate | 20.0 grams | 30.0 grams | 40.0 grams | | |
| Silicone emulsifier | 1.0 gram | 1.0 gram | 1.0 gram | 1.0 gram | 1.0 gram. |
| TMBDA | 1.5 milliliters | 1.5 milliliters | 1.5 milliliters | 0.8 milliliter | 1.5 milliliters. |
| Trichloromonofluoromethane | 30.0 grams | 31.0 grams | 32.0 grams | 29.0 grams | 29.0 grams. |
| Mixing time at 850 r.p.m | 15 seconds | 15 seconds | 15 seconds | 20 seconds | 20 seconds. |
| Cream time | 28 seconds | 27 seconds | 28 seconds | 35 seconds | 30 seconds. |
| Set time | 87 seconds | 85 seconds | 88 seconds | 105 seconds | 85 seconds. |
| Density, pounds, per cubic foot | 1.87 | 1.88 | 1.91 | 1.64 | 1.72. |
| Properties of foam after 1 hour cure at room temperature | Friable and weak. Some primary shrinkage. | Friable and weak. Some primary shrinkage. | Friable and weak. Some primary shrinkage. | Friable and weak. No primary shrinkage. | Friable and weak. No primary shrinkage. |
| Properties of foam after 16 hours cure at room temperature | Friable and weak. Good foam appearance with fine cell structure. Very slight primary shrinkage. | Friable and weak. Good foam appearance with fine cell structure. Very slight shrinkage. | Friable and weak. Fine cell structure and slight primary shrinkage. | Friable and weak. Good foam appearance with fine cell structure. | Friable and weak. Good foam appearance with fine cell structure. |

NOTE.—The above foams were prepared by initially admixing all the ingredients other than the isocyanate and, then admixing this blend with the organic polyisocyanate.

EXAMPLE IV

*Reaction of 1 mole of urea with 7.55 moles of propylene oxide*

A hydroxyl-terminated carbamate polyol was prepared from the following ingredients:

| | Moles | Grams |
|---|---|---|
| Urea | 6.0 | 360 |
| Propylene oxide | 45.3 | 2630 |

The urea, 450 grams of propylene oxide and 2.12 grams of 85 percent potassium hydroxide were charged to an autoclave having an agitator and external heating means. The reaction mixture was agitated and gradually heated to a temperature of about 280° F., at which point the temperature increased to about 300° F. because of the exothermic reaction taking place. The maximum pressure of 150 pounds per square inch gauge was reached when the temperature had increased to 300° F. The temperature was maintained at about 260° F. to 265° F., while the reaction pressure dropped to about 70 pounds per square inch gauge. The pressure of the reactor was then maintained at about 70 pounds per square inch gauge by the incremental addition of the remaining propylene oxide. Propylene oxide was added incrementally for about 6 hours. At this point, the reaction was discontinued for a period of 16 hours. At the end of the 16-hour period, the reaction mixture was again heated to about 260° F. The pressure remained at 0 pound per square inch gauge, indicating the absence of substantial quantities of unreacted propylene oxide. The propylene oxide addition was resumed and the pressure was raised to 75 pounds per square inch gauge. The propylene oxide addition was continued for about 10 minutes. Upon completion of the propylene oxide addition, the reaction pressure began to drop. The reaction temperature, however, was maintained at about 260° F. until the reaction pressure reached 0 pound per square inch gauge. This required a period of about 4 hours. About 2793 grams of crude reaction product were recovered from the 2992 grams of material charged.

The crude reaction product was purified by vacuum distillation, thereby removing the volatile impurities. About 2784 grams of the crude product were distilled in the presence of about 2 grams of 85 percent phosphoric acid at a temperature ranging from about 90° C. to about 120° C. and a vacuum of about 15 millimeters of mercury. The distillation required about 90 minutes.

About 2740 grams of reaction product were recovered. The purified reaction product had a hydroxyl number of 468, a viscosity of 524 centipoises, moisture content of 0.213 percent by weight of water, and an ash content of 75 parts per million.

Rigid foams were prepared by reacting the purified ureapropylene oxide polymer with various isocyanates in the manner set forth in the following table.

EXAMPLE IV—TABLE 1

| Materials | Foam IV-A | Foam IV-B | Foam IV-C |
| --- | --- | --- | --- |
| Nacconate 4040, grams | 100 | | |
| Mondur MR, grams | | 100 | |
| PAPI, grams | | | 100 |
| Purified ureapropylene oxide polyol (OH—468), grams | 111 | 90 | 90 |
| Silicone emulsifier, gram | 1.0 | 1.0 | 1.0 |
| 1.8 DMEA/0.1 DABCO, milliliter | 1.0 | | |
| TMBDA, milliliter | | 0.4 | 0.7 |
| Trichloromonofluoromethane, grams | 35 | 31 | 31 |
| Mixing time at 850 r.p.m., seconds | 15 | 15 | 15 |
| Cream time, seconds | 25 | 27 | 30 |
| Set time, seconds | 100–110 | 65–70 | 115–120 |

Foam IV-A was initially very friable and weak. The interior of the foam was still weak and friable after curing at room temperature for 24 hours.

Foam IV-B was initially friable and weak inside. The foam, however, had good appearance and fine cell structure, although it was still slightly friable and weak internally after curing at room temperature for 24 hours. The foam had a density of 1.81 pounds per cubic foot.

Foam IV-C was initially friable and weak inside, although having good appearance and fine cell structure. The foam was still slightly friable and weak internally after curing at room temperature for 24 hours. This foam had a slight amount of primary shrinkage.

EXAMPLE V

PART I

*Reaction of 1 mole of urea with 4 moles of propylene oxide in the presence of water and $H_2SO_4$*

In Examples I through IV, inclusive, hydroxyl-terminated carbamate polyols were prepared from urea and propylene oxide in the substantial absence of water and in the presence of a basic catalyst. The present example describes the preparation of a hydroxyl-terminated carbamate polyol by the reaction of urea and propylene oxide in the presence of water and an acid catalyst.

The following ingredients were charged to an autoclave having an agitator and external heating means:

| | Moles | Grams |
| --- | --- | --- |
| Water | | 90 |
| Urea | 8.5 | 510 |
| Concentrated sulfuric acid | | 10.2 |

After the above solution of ingredients had been added to the preheated reaction vessel, the temperature of the reaction mixture was raised to about 220° F. Propylene oxide was added incrementally to maintain the reaction pressure at about 55 pounds per square inch gauge. A total of about 2090 grams of propylene oxide (about 36 moles) were added over a 9-hour period. After all the propylene oxide had been added, the reaction vessel temperature was maintained at about 260° F., thereby permitting the remaining amount of unreacted propylene oxide in the vessel to react and the reaction pressure thereby decreasing. About 2438 grams of crude reaction product were obtained.

The crude reaction product was purified by stripping it of the more volatile materials. About 2412 grams of the crude product were heated to a temperature of about 80° C. in a vacuum distillation apparatus. At this temperature vacuum was applied and the product was distilled under a vacuum of about 10 millimeters of mercury at a temperature range of about 80° C. to about 120° C. for a period of about 2½ hours. The distillation residue was filtered and about 2336 grams of purified reaction product were recovered. The purified reaction product had a hydroxyl value of 677.8, a viscosity of 680 centipoises at 77° F., a nitrogen content of 8.48 percent by weight, a moisture content of 0.118 percent by weight, and an ash content of 343 parts per million.

Rigid foams were prepared of the above hydroxyl-terminated carbamate polyol by reaction with various organic polyisocyanates. The preparation of these foams and their properties are tabulated below.

EXAMPLE V.—TABLE 1

| Materials | Foam V-A | Foam V-B |
| --- | --- | --- |
| Nacconate 4040, grams | 100 | |
| PAPI, grams | | 100 |
| Urea-propylene oxide polyol (hydroxyl number, 677.8), grams | 76.5 | 62 |
| Silicone emulsifier, gram | 1.0 | 1.0 |
| 1.8 DMEA/0.1 DABCO, milliliter | 0.6 | |
| Trichloromonofluoromethane, grams | 29 | 26.5 |
| Mixing time at 850 r.p.m., seconds | 6 | 10 |
| Cream time, seconds | 6 | 33 |
| Set time, seconds | 15–30 | 83 |
| Density, pounds per cubic foot | 1.36 | 1.67 |
| Water vapor transmission, perms per inch | | 2.42 |

Foam V-A was initially friable, however, it had fine cell structure and good appearance. After curing at room temperature for 24 hours, the foam had a tougher interior but was still friable on the surface.

Foam V-B was initially slightly friable, although it had fine cell structure and good appearance. After curing at room temperature for 24 hours, the foam became tough internally, although still slightly friable on the surface. The foam exhibited some primary shrinkage.

Foam V-B is of special interest in that it exhibits the auto-catalytic properties of the carbamate polyols of the instant invention. No reaction catalyst was included in the foam formulation of foam V-B.

The heat distortion resistance of foam V-B was tested. The results are tabulated below.

EXAMPLE V.—TABLE 2

| Test Conditions | Length, 2 inches | Width, 2 inches | Thickness, 1 inch |
| --- | --- | --- | --- |
| | Percent | Percent | Percent |
| 200° F. for 24 hours | 0.78 | 0 | −2.3 |
| 200° F. for 72 hours | 0.39 | 0 | −1.5 |
| 200° F. for 1 week | 0.78 | 0.78 | −1.5 |
| 158° F., 100 percent relative humidity for 24 hours | 0.78 | 0 | −1.56 |
| 158° F., 100 percent relative humidity for 1 week | 0.78 | 0.39 | −1.5 |
| 158° F., 100 percent relative humidity for 2 weeks | 0.78 | 0.78 | −1.5 |
| 158° F., 100 percent relative humidity for 4 weeks | 2.2 | 1.95 | −1.5 |

The following table illustrates the effects of certain phosphorus-containing compounds upon the properties of polyurethane foams prepared from the urea-alkylene oxide adducts of this example.

The polyurethane foams illustrated below were prepared in a typical manner, that is, all the ingredients other than the polyisocyanate were admixed with the urea-propylene oxide polyol and then this mixture was blended with the organic polyisocyanate to form a reactive, foam-forming mixture.

EXAMPLE V.—TABLE 3

| Ingredients | Foam V-C | Foam V-D | Foam V-E | Foam V-F | Foam V-G |
| --- | --- | --- | --- | --- | --- |
| PAPI, grams | 110.0 | 110.0 | 110.0 | 110.0 | 110.0 |
| Urea-propylene oxide polyol (OH—677), grams | 55.0 | 55.0 | 55.0 | 55.0 | 55.0 |
| Phosphorus polyol (OH—260), grams | 20.0 | 20.0 | 20.0 | 20.0 | 20.0 |
| Tris(dichloropropyl)phosphate, grams | 15.0 | 15.0 | 15.0 | 15.0 | 25.0 |
| Tetramethylbutanediamine, milliliter | | 0.4 | 0.4 | 0.4 | 0.4 |
| Silicone emulsifier, gram | 1.0 | | | 1.0 | 1.0 |
| Liquid non-ionic surfactant (molecular weight, 2,120; hydroxyl number, 53), gram | | | 1.0 | | |
| Trichloromonofluoromethane, grams | 25.0 | 25.0 | 26.0 | 25.0 | 26.0 |
| Mixing time at 850 r.p.m., seconds | 15 | 15 | 15 | 15 | 15 |
| Cream time, seconds | 50 | 30 | 33 | 34 | 39 |
| Set time, seconds | 113 | 82 | 85 | 87 | 98 |
| Density of cured foam, pounds per cubic foot | 2.16 | | | 2.16 | 2.36 |
| Water vapor transmission of cured foam, perms per inch | 2.57 | | | 3.38 | 3.94 |

Foam V-C evidenced a slight amount of initial friability, had a fairly tough interior and good over-all foam appearance. This foam was self-extinguishing and when tested in accordance with the procedures of ASTM-D-1692-59T, it burned to 1 inch in 40 seconds and self-extinguished in 43 seconds.

Foam V-D was poor in appearance, had medium cell structure and evidenced signs of incompatibility.

Foam V-E had fair appearance and fine to medium cell structure. This foam also evidenced signs of incompatibility.

Foam V-F had good foam appearance, a slight amount of initial friability and a tough interior. This foam evidenced some surface adhesion to the mold and fair primary shrinkage. The foam became tougher after curing at room temperature for 24 hours. This foam was also self-extinguishing and when tested in accordance with ASTM-D-1692-59T test procedures, it burned to 1 inch in 34 seconds and self-extinguished in 40 seconds.

Foam V-G had good appearance, slight initial friability and a tough interior. This foam evidenced slight adherence to the mold and fair primary shrinkage. This foam became tougher after curing at room temperature for 24 hours. This foam was self-extinguishing in 37 seconds and burned only 0.95 inch in that time. The flame retardancy was tested in accordance with ASTM-D-1692-59T procedures.

EXAMPLE V

PART II

The urea-alkylene oxide reaction product of this example was further distilled to remove the low molecular weight fractions. This distillation was conducted in a distillation vessel equipped with temperature recording means, an azeotrope separator, condenser, and external heating means.

About 400 grams of the urea-alkylene oxide resin having a hydroxyl number of 677 were charged to the distillation vessel and gradually heated to about 116° C., at which time the pressure in the distillation vessel was reduced to about 150 millimeters. The distillation proceeded for about 1 hour and the temperature gradually raised to 130° C. while the vacuum was lowered to about 1.8 millimeters of mercury.

About 356 grams of product were recovered and about 40 grams of distillate were recovered. The distillate had a slight odor of ammonia, a nitrogen content of about 0.66 percent, and a hydroxyl value of 1313. The refined alkylene oxide-urea resin had a nitrogen content of 9.44 percent and a hydroxyl value of 571.3.

A rigid polyurethane foam was prepared from the refined urea-propylene oxide polyol by mixing 91 grams of this material with 1 gram of silicone emulsifier and 28.5 grams of trichloromonofluoromethane. This blend was then admixed with 100 grams of crude TDI (Nacconate 4040). The blend of reactive materials was mixed at 850 r.p.m. for 10 seconds. The cream time of the mixture was 13 seconds and its set time was 49 seconds.

This foam had good appearance and fine cells. The skin of the foam was slightly friable and powdery, however, the interior was fairly tough and strong.

EXAMPLE VI

*Reaction of 1 mole of urea with 3 moles of propylene oxide*

About 600 grams of urea (10.0 moles) and 1740 grams of propylene oxide (30.0 moles) were reacted by charging urea, 3.52 grams of 85 percent potassium hydroxide and 750 grams of the propylene oxide to a pressure vessel equipped with an agitator and external heating means. The reactor contents were heated to about 270° F., at which point the reaction became exothermic, carrying the temperature of the reaction mixture to about 345° F. The maximum pressure attained during this period was about 300 pounds per square inch gauge. After the peak of the exotherm had passed, the reaction mixture was maintained at about 250° F., while the pressure was maintained in the range of about 75 to about 100 pounds per square inch gauge. The propylene oxide was added incrementally and the pressure was maintained at about 75 pounds per square inch gauge for the remainder of the addition.

After the reaction mixture had cooled and the pressure had diminished, the reactor contents were drained and 2380 grams of reaction product recovered.

About 2324 grams of reaction product were charged to a distillation vessel for purification. The temperature was raised gradually over about a 3-hour period to about 90° C. at atmospheric pressure. During this period, a total of about 19.2 grams of 85 percent phosphoric acid had been added to neutralize the reaction product. The distillation vessel was then placed under a vacuum and the reaction product was vacuum stripped at a temperature of about 120° C. and at a pressure of about 15 millimeters of mercury. Before filtering, about 2304 grams of stripped reaction product were recovered. The stripped reaction product had a hydroxyl value of 657.1, a viscosity of 2230 centipoises at 77° F., and a moisture content of 0.156 percent.

Foams were prepared from the stripped urea-propylene oxide reaction product of Example VI. The formulations and properties of these foams are tabulated in the following table:

EXAMPLE VI—TABLE 1

| Ingredients | Foam VI-A | Foam VI-B |
| --- | --- | --- |
| Crude TDI (Nacconate 4040), grams | 100 | |
| PAPI, grams | | 100 |
| Urea-propylene oxide polyol (OH—657.1), grams | 79 | 64 |
| Silicone emulsifier, gram | 1.0 | 1.0 |
| 1.8 DMEA/0.1 DABCO, milliliter | 0.9 | |
| Tetramethylbutanediamine, milliliter | | 0.6 |
| Trichloromonofluoromethane, grams | 29.5 | 27 |
| Mixing time at 850 r.p.m., seconds | 12 | 8 |
| Cream time, seconds | 15 | 28 |
| Set time, seconds | 40 | 65 |
| Density of cured foam, pounds per cubic foot | 1.57 | 1.50 |

Foam VI-A was initially friable and powdery on the surface. The interior of the foam was fairly tough. After curing for 24 hours at room temperature, the surface of the foam was still friable.

Foam VI-B had only a slight amount of initial friability and was fairly tough internally. This foam had a good appearance and fine cell structure. The foam was still slightly friable after curing at room temperature for 24 hours, however, the surface was tough after curing in excess of 48 hours at room temperature.

The following foam formulation was utilized to prepare a foam for determination of properties at low temperatures.

EXAMPLE VI.—TABLE 2

Foam VI-C

Ingredients:
- PAPI _____ grams__ 100
- Urea-propylene oxide polyol (OH—657.1) grams__ 64
- Silicone emulsifier _____ do____ 1.0
- Tetramethylbutanediamine _____ milliliters__ 0.4
- Trichloromonofluoromethane _____ grams__ 31
- Mixing time at 850 r.p.m. _____ seconds__ 13
- Cream time _____ do____ 30
- Set time _____ do____ 70

Two hundred ten (210) grams of an identical foam formulation were charged into a mold having the dimension of 3 inches by 11 inches by 11 9/16 inches. The top was placed on the mold and the formulation was allowed to cellulate at 120° F. The packing factor of this formulation in this mold is approximately 29.9 percent. The cured foam was removed from the mold. The surface of the foam was fairly friable and some of the skin adhered to the mold. There was no primary shrinkage and the interior of the foam was fairly tough. The density of this foam was 2.10 pounds per cubic foot.

When the molded foam was subjected to −16° F. temperatures for 24 hours, it experienced only very slight shrinkage.

Flame retardant foams were prepared according to the following formulations.

EXAMPLE VI.—TABLE 3

| Ingredients | Foam VI-D | Foam VI-E |
|---|---|---|
| PAPI, grams | 105 | 105 |
| Urea-propylene oxide polyol (OH—657.1), grams | 56 | 48.5 |
| Phosphorus polyol (OH—261) prepared by reaction of propylene oxide with mixture of mono and dibutyl acid phosphate, grams | 20 | 40 |
| Silicone emulsifier, gram | 1.0 | 1.0 |
| Tetramethylbutanediamine, milliliter | 0.4 | 0.4 |
| Trichloromonofluoromethane, grams | 29.5 | 31.5 |
| Mixing time at 850 r.p.m., seconds | 13 | 13 |
| Cream time, seconds | 35 | 40 |
| Set time, seconds | 83 | 102 |
| Density of cured foam, pounds per cubic foot | 1.60 | 1.71 |

Foams VI-D and VI-E were initially friable although they had a fine cell structure and were fairly tough inside. These foams were less friable after curing at room temperature for 24 hours.

These foams were tested for fire retardancy according to procedures set forth in ASTM-D-1692-59T. Foam VI-D burned to 1 inch in 24 seconds. After 1.8 inches of the foam had been consumed in 55 seconds, the flame self-extinguished. Foam VI-E burned 1 inch in 27 seconds and self-extinguished in 46 seconds after burning 1.3 inches.

To determine the effect upon foam properties, a polyester resin was included in the following foam formulation. This polyester resin was the reaction product of 1 mole of phthalic anhydride and 2 moles of tris(hydroxypropyl)glycerol. The polyester had an acid number of 4.5 and a hydroxyl number of 339.

EXAMPLE VI.—TABLE 4

Ingredients: Foam VI-F
- PAPI _____ grams__ 110
- Polyester (OH—339) _____ do____ 45.5
- Urea-propylene oxide polyol (OH—657.1) _____ do____ 40
- Silicone emulsifier _____ do____ 1.0
- Tetramethylbutanediamine _____ milliliters__ 1.0
- Trichloromonofluoromethane _____ grams__ 33

Seconds
- Mixing time at 850 r.p.m. _____ 13
- Cream time _____ 25
- Set time _____ 69

Foam VI-F had a slight amount of initial friability on the surface, although the interior of the foam was tough and the foam had a fine cell structure. After curing for 48 hours at room temperature, the foam became very tough. The density of this foam was 1.81 pounds per cubic foot and the water vapor transmission value was 1.95 perms per inch.

A 2-inch by 2-inch by 1-inch sample of this foam was tested at high temperature and high humidity conditions for distortion resistance. The results are tabulated as follows:

EXAMPLE VI.—TABLE 5

| Test Condition | 2-inch Side, percent | 2-inch Side, percent | 1-inch Side, percent |
|---|---|---|---|
| 158° F., 100 percent relative humidity for 24 hours | 2.2 | 3.9 | −2.3 |
| 158° F., 100 percent relative humidity for 1 week | 2.7 | 3.1 | −2.3 |
| 158° F., 100 percent relative humidity for 2 weeks | 1.95 | 2.2 | 0 |
| 158° F., 100 percent relative humidity for 4 weeks | 2.2 | 2.7 | 0 |
| 200° F. for 48 hours | 1.2 | 0 | −1.56 |
| 200° F. for 1 week | 1.95 | 1.95 | 0 |

EXAMPLE VII

*Reaction of 1 mole of urea with 4 moles of propylene oxide in the presence of water and sulfuric acid*

About 510 grams (8.5 moles) of urea and 1980 grams (34.0 moles) of propylene oxide were reacted in the following manner. The urea, 90 grams of water, and 5.1 grams of concentrated sulfuric acid were charged to a pre-heated reactor equipped with an external circulating line and temperature measuring device. This mixture was heated to 220° F. and the propylene oxide was added incrementally to maintain the pressure in the reactor at about 55 to about 60 pounds per square inch gauge. The temperature of the reaction was maintained at about 230° F. to 240° F. The addition of the propylene oxide required about 5⅓ hours. After the last increment of propylene oxide had been added, the temperature was continued at about 240° F. for about 5 hours, the pressure steadily dropping, indicating the consumption of the propylene oxide by reaction with urea. After the pressure of the reactor had reduced to 0, the reaction product was drained and 2503 grams were recovered.

The reaction product was vacuum stripped under about 10 millimeters of mercury pressure at a temperature of about 120° C. for about 7 hours.

Of the 2485 grams of reaction product charged, about 2336 grams of the purified reaction product were recovered. About 122 grams of distillate were recovered, having a refractive index of 1.4008, indicating the distillate to contain about 69 percent glycol and about 31 percent water.

The purified reaction product was filtered. The purified reaction product had a Brookfield viscosity of 945 centipoises at 77° F., a hydroxyl content of 689.4, a nitrogen content of 8.97 percent, and a moisture content of 0.076 percent.

The properties of the urea-propylene oxide polyol were evaluated in the preparation of polyurethane foams by reaction with various isocyanates. The results are tabulated in the following table:

EXAMPLE VII.—TABLE 1

| Ingredients | Foam VII-A | Foam VII-B | Foam VII-C |
|---|---|---|---|
| Crude TDI (Nacconate 4040), grams | 100 | | |
| Crude MDI (Mondur-MR), grams | | 100 | |
| PAPI, grams | | | 100 |
| Urea-propylene oxide polyol (OH—689.4), grams | 75.0 | 61.5 | 61.5 |
| Silicone emulsifier, gram | 1.0 | 1.0 | 1.0 |
| Trichloromonofluoromethane, grams | 26.0 | 24.0 | 24.0 |
| Mixing time at 850 r.p.m., seconds | 10 | 10 | 10 |
| Cream time, seconds | 19 | 27 | 38 |
| Set time, seconds | 53 | 62 | 85 |
| Density of cured foam, pounds per cubic foot | 1.15 | 1.69 | 1.69 |
| Foam appearance | Good | Good | Good |
| Primary shrinkage | None | None | None |
| Cell structure | Fine | Fine | Fine |

Foam VII-A was friable and powdery on the surface and was somewhat friable and weak on the inside.

Foams VII-B and VII-C were friable on the surface, but were tough and strong on the inside. Samples of these foams (2-inch by 2-inch by 1-inch dimensions) were immersed in water for 1 week. The samples did not distort and no water was found in the interior of the sample.

The resistance of foams VII-B and VII-C to distortion at high temperatures and high humidity was evaluated. The results are tabulated as follows:

EXAMPLE VII.—TABLE 2

| Test Conditions | Foam VII-B | Foam VII-C |
|---|---|---|
| 200° F. for 48 hours | 0 and 0 percent expansion. No distortion. | 0 and 0 percent expansion. No distortion. |
| 158° F., 100 percent relative humidity for 24 hours. | do | Do. |
| 200° F. for 1 week | do | Do. |
| 158° F., 100 percent relative humidity for 1 week. | 0 and 0 percent expansion. Very slight distortion. | 0 and 0.5 percent expansion. Very slight distortion. |

The expansion of these foams was checked in two directions.

EXAMPLE VIII

*Reaction of 1 mole of urea with 4 moles of propylene oxide in water without a catalyst*

About 510 grams (8.5 moles) of urea and 90 grams of water were charged to a preheated reactor equipped with external recirculating line and external heating means and temperature measuring device. This mixture was heated to about 220° F. before propylene oxide addition was begun. About 1980 grams (34 moles) of propylene oxide were added over approximately 5 hours. During this period, the temperature was maintained at about 230° F. to about 240 F. and the pressure was maintained at about 60 pounds per square inch gauge. After the propylene oxide addition was completed, the reaction mixture was maintained at about 240° F. for an additional 2½ hours. The pressure during this time was steadily diminishing, indicating the complete reaction of the propylene oxide with the urea.

The reactor was drained and about 2525 grams of reaction product were recovered.

The reaction product was purified by charging 2494 grams to a vacuum distillation apparatus. The reaction product was stripped at about 10 millimeters of mercury pressure at a temperature of about 120° C. for about 1½ hours. About 2367 grams of purified reaction product were recovered. About 80 grams of distillate were recovered. The refractive index of the distillate was 1.3682, indicating that it contained about 36 per cent glycol and about 64 per cent water.

The purified reaction product was filtered. The filtered reaction product had a hydroxyl value of 726.7, a moisture content of 0.063 percent, a Brookfield viscosity of 788 centipoises at 77° F., a nitrogen content of 9.38 percent, and an ash content of 0.054 percent.

Rigid polyurethane foams were prepared from the above urea-propylene oxide polyol by reaction with various isocyanates according to the following formulation:

EXAMPLE VIII.—TABLE 1

| Ingredients | Foam VIII-A | Foam VIII-B | Foam VIII-C | Foam VIII-D |
|---|---|---|---|---|
| Crude TDI (Nacconate 4040), grams | 100 | 100 | | |
| Crude MDI (Mondur-MR), grams | | | 100 | |
| PAPI, grams | | | | 100 |
| Urea-propylene oxide polyol (OH—726.7), grams | 71.5 | 71.5 | 58.0 | 58.0 |
| Silicone emulsifier, gram | 1.0 | 1.0 | 1.0 | 1.0 |
| Trichloromonofluoromethane, grams | 22.0 | 16.5 | 23.5 | 23.5 |
| Mixing time at 850 r.p.m. seconds | 8 | 7 | 10 | 10 |
| Cream time, seconds | 10 | 9 | 22 | 37 |
| Set time, seconds | 31 | 27 | 50 | 71 |
| Density of cured foam, pounds per cubic foot | 1.07 | 1.09 | 1.60 | 1.61 |
| Properties of foam after ½ hour cure at room temperature | (¹) | (¹) | (²) | (²) |

¹ Friable and weak.
² Friable surface, strong interior.

Foams VIII-C and VIII-D were the better foams. These foams were cured overnight and were found to have slightly friable surface, but strong interiors. These foams had fine cells, good appearance, and did not undergo any primary shrinkage.

Foams VIII-C and VIII-D were tested for fire retardancy according to procedures set forth in ASTM-D-1692-59T. Foam VIII-C burned 1 inch in 18 seconds and self-extinguished in 27 seconds after burning 1¼ inches. Foam VIII-D burned 1 inch in 17 seconds and self-extinguished in 29 seconds after burning 1⅜ inches.

The following table illustrates the results obtained when various additives were combined in rigid foam formulations containing the urea-propylene oxide polyol of this example.

EXAMPLE VIII.—TABLE 2

| Ingredients | Foam VIII-E | Foam VIII-F | Foam VIII-G | Foam VIII-H | Foam VIII-I |
|---|---|---|---|---|---|
| PAPI | 100.0 grams | 100.0 grams | 100.0 grams | 100.0 grams | 100.0 grams. |
| Urea-propylene oxide polyol (OH—726.7). | 54.5 grams | 51.0 grams | 48.0 grams | 38.0 grams | 47.0 grams. |
| Mixture of mono- and dibutyl acid phosphate. | 5.0 grams | 10.0 grams | | | |
| LA-700 (condensate of diethylenetriamine with alkylene oxide). | | | 10.0 grams | 20.0 grams | |
| N,N,N',N'-tetrakis (2-hydroxypropyl)ethylenediamine. | | | | | 10.0 grams. |
| Silicone emulsifier | 1.0 gram | 1.0 gram | 1.0 gram | 1.0 gram | 1.0 gram. |
| Trichloromonofluoromethane. | 24.0 grams | 24.0 grams | 23.5 grams | 24.0 grams | 24.0 grams. |
| Mixing time at 850 r.p.m. | 10 seconds | 10 seconds | 10 seconds | 10 seconds | 10 seconds. |
| Cream time | 36 seconds | 38 seconds | 25 seconds | 19 seconds | 27 seconds. |
| Set time | 76 seconds | 93 seconds | 53 seconds | 38 seconds | 59 seconds. |
| Density of cured foam, pounds per cubic foot. | 1.50 | 1.65 | 1.62 | 1.76 | 1.46. |
| Over-all foam appearance | Good | Good | Good | Good | Good. |
| Cell structure | Small | Medium, some open cells. | Fine | Fine | Fine. |
| Foam properties after 24 hours cure at room temperature. | Friable surface, weak interior. | Extremely weak and friable. | Slightly friable surface, strong interior. | Tough and strong over-all. | Friable surface, strong interior. |
| Flame retardancy according to ASTM-D-1692-59T. | 1 inch in 18 seconds, 5 inches in 130 seconds. | | 1 inch in 13 seconds, 2 1/16 inches in 34 seconds, self-extinguishing. | 1 inch in 18 seconds, 2 9/16 inches in 53 seconds, self-extinguishing. | 1 inch in 13 seconds, 1 7/16 inches in 29 seconds, self-extinguishing. |

Foams VIII–E, VIII–G, VIII–H, and VIII–I showed no signs of expansion or distortion when subjected to 200° F. for 48 hours, nor when subjected to 158° F. and high humidity for 24 hours.

The following rigid foam formulations include various polyol additives with the urea-propylene oxide polyol of this example in order to determine the effect of such additives upon the properties of the resulting foams. The polyester additive having a hydroxyl number of 378 and an acid number of 7.86 is the reaction product of 1 mole of phthalic anhydride with 2 moles of tris (hydroxypropyl)-glycerol. The phosphorus polyol having a hydroxyl number of about 261 is the reaction product of propylene oxide with a mixture of mono- and dibutyl acid phosphate.

About 400 grams (6.66 moles) of urea, 70 grams of water, and 2.0 grams of concentrated sulfuric acid were admixed until a solution had formed. This solution was charged to a preheated reactor having an external circulating line, external heating means and temperature measuring device. While maintaining the temperature at about 240° F., a total of 1550 grams (26.8 moles) of propylene oxide were added to the reaction mixture at a rate sufficient to maintain the reaction pressure at about 60 pounds per square inch gauge. The propylene oxide addition required about 4½ hours. Then, while maintaining the temperature at about 240° F., about 295 grams of ethylene oxide were added over about a 1-hour period at a rate sufficient to maintain the reaction pressure at about 60 pounds per square inch gauge. While maintaining the reaction temperature about 240° F. for an additional 4 hours, the reaction was allowed to continue until

EXAMPLE VIII.—TABLE 3

| Ingredients | Foam VIII-J | Foam VIII-K | Foam VIII-L | Foam VIII-M |
|---|---|---|---|---|
| PAPI | 105.0 grams | 105.0 grams | 105.0 grams | 105.0 grams. |
| Polyester polyol (OH—378) | 30.0 grams | 30.0 grams | | |
| Urea-propylene oxide polyol (OH—726.7) | 42.0 grams | 38.0 grams | 51.0 grams | 47.0 grams. |
| Phosphorus polyol (OH—261). | | 10.0 grams | | |
| Trimethylolpropane-propylene oxide reaction product having a hydroxyl number of 230. | | | 20.0 grams | |
| Trimethylolpropane-propylene oxide reaction product having a hydroxyl number of 400. | | | | 20.0 grams. |
| Silicone emulsifier | 1.0 gram | 1.0 gram | 1.0 gram | 1.0 gram. |
| Trichloromonofluoromethane. | 29.0 grams | 30.0 grams | 28.5 grams | 28.0 grams. |
| Tetramethylbutanediamine | 0.3 milliliter | | | |
| Mixing time at 850 r.p.m. | 8 seconds | 10 seconds | 10 seconds | 10 seconds. |
| Cream time | 9 seconds | 17 seconds | 35 seconds | 33 seconds. |
| Set time | 30 seconds | 48 seconds | 89 seconds | 86 seconds. |
| Density of cured foam, pounds per cubic foot. | 1.55 | 1.58 | 1.57 | 1.48. |
| Foam appearance | Good | Good | Good | Good. |
| Cell structure | Fine | Fine | Fine | Fine. |
| Foam properties after curing at room temperature for 16 hours. | Strong, tough surface and interior. | Strong, tough surface and interior. | Slightly friable surface, tough interior. | Slightly friable surface, tough interior. |
| Flame retardancy according to ASTM-D-1692-59T. | 1 inch in 17 seconds, 2 3/16 inches in 35 seconds, self-extinguishing. | 1 inch in 20 seconds, 1 3/8 inches in 35 seconds, self-extinguishing. | 1 inch in 14 seconds, 2 7/16 inches in 37 seconds, self-extinguishing. | 1 inch in 14 seconds, 3 3/4 inches in 51 seconds, self-extinguishing. |

EXAMPLE IX

*Urea-propylene oxide-ethylene oxide reaction product*

A polyhydroxy resin was prepared from 1 mole of urea, 4 moles of propylene oxide and 1 mole of ethylene oxide in the following manner:

the reaction pressure was about 0 pound per square inch gauge.

The reaction vessel was drained and about 2255 grams of reaction product were recovered. About 1942.2 grams of this reaction product was purified by distilling at a temperature of about 112° C. to about 120° C. at a vacuum of 10 millimeters of mercury pressure for about 1 hour. About 4 grams of distillate were recovered which contained about 12.5 percent glycol and about 87.5 percent water. About 1935.6 grams of reaction product were recovered. The reaction product had a nitrogen content of 7.94 percent, a moisture content of 0.047 percent, an ash content of 113 parts per million, and a hydroxyl value of 738.5.

Rigid polyurethane foams were prepared from the above urea-propylene oxide-ethylene oxide polyol according to the following formulations:

EXAMPLE IX.—TABLE 1

| Ingredients | Foam IX-A | Foam IX-B | Foam IX-C |
|---|---|---|---|
| Crude TDI (Nacconate 4040), grams | 100.0 | | |
| Crude MDI (Mondur-MR), grams | | 100.0 | |
| PAPI, grams | | | 100.0 |
| Urea-propylene oxide-ethylene oxide polyol (OH—738.5), grams | 70.0 | 57.0 | 57.0 |
| Silicone emulsifier, gram | 1.0 | 1.0 | 1.0 |
| Trichloromonofluoromethane, grams | 25.5 | 23.5 | 23.5 |
| Mixing time at 850 r.p.m., seconds | 8 | 10 | 10 |
| Cream time, seconds | 11 | 16 | 32 |
| Set time, seconds | 34 | 43 | 68 |
| Compatibility of isocyanate and polyol premix | Good | Good | Good |

Foam IX-A became very hot during the foaming action. The resulting foam had a number of fissures and was extremely friable and weak.

Foam IX-B had a friable surface and tough interior after curing at room temperature for 1 hour. After curing at room temperature for 16 hours, the surface of the foam was still friable and the interior was strong and not friable. This foam had fine cells and a good appearance.

Foam IX-C had a friable surface and strong interior after curing at room temperature for 1 hour. After curing at room temperature for 16 hours, the foam had a friable surface and a strong, tough interior. The appearance of this foam was good and it possessed fine cells.

Rigid polyurethane foam blown with carbon dioxide was prepared from the above urea-propylene oxide-ethylene oxide polyol according to the following formulation:

EXAMPLE IX.—TABLE 2

Foam IX-D

Ingredients:
- PAPI ___grams__ 100.0
- Urea-propylene oxide-ethylene oxide polyol (OH—738.5) ___grams__ 38.0
- Silicone emulsifier ___do____ 1.0
- Water ___do____ 2.2
- Mixing time at 850 r.p.m. ___seconds__ 10
- Cream time ___do____ 25–30
- Set time ___do____ 35–40

The resulting foam had a good rise and contained good cell structure. The foam was not friable after curing at room temperature for 1 hour.

EXAMPLE X

*Reaction of 1 mole of urea with 2.7 moles of propylene oxide in water with triethylamine catalyst*

A solution was prepared of 510 grams (8.5 moles) of urea, 90 grams of water, and 10.2 grams of triethylamine by adding the urea and triethylamine to the water while maintaining the temperature of the water above about 50° C. This solution was charged to a preheated reactor having an external recirculating line, external heating means, and temperature recording device. While maintaining the temperature of the reaction mixture at about 230° F. to 270° F., about 1340 grams of propylene oxide were added incrementally at a rate sufficient to maintain the reaction pressure at about 50 to 60 pounds per square inch guage. The propylene oxide addition required about 7 hours. After the reaction vessel had cooled, about 1728 grams of reaction product were recovered.

About 1666 grams of the reaction product were vacuum stripped under a vacuum of about 10 millimeters of mercury pressure at a temperature of about 80° C. to about 120° C. for about 3 hours. At this point, about 9 grams of 85 percent phosphoric acid were added and the vacuum stripping was continued under about 10 millimeters of mercury pressure and at a temperature of about 100° C. to 125° C. After the acid addition, the distillation was carried on for a period of about 5 hours.

The purified reaction product was filtered and about 1499 grams were recovered which had a hydroxyl number of 710.0, a viscosity of 8010 centipoises, a moisture content of 0.112 percent, and a nitrogen content of 12.33 percent.

Rigid polyurethane foams were prepared from a blend of the above urea-propylene oxide polyols and a polyol having a hydroxyl number of 502 prepared from 1 mole of dipropylene glycol and 2 moles of ethylene oxide.

EXAMPLE X.—TABLE 1

| Ingredients | Foam X-A | Foam X-B | Foam X-C | Foam X-D |
|---|---|---|---|---|
| Crude MDI (Mondur-MR) | 100.0 grams | 100.0 grams | 100.0 grams | 100.0 grams. |
| Urea-propylene oxide polyol (OH—710) | 36.8 grams | 36.8 grams | 36.8 grams | 28.4 grams. |
| Dipropylene glycol-ethylene oxide polyol (OH—502) | 36.8 grams | 36.8 grams | 36.8 grams | 42.6 grams. |
| Silicone emulsifier | 0.6 gram | 0.6 gram | 0.6 gram | 0.6 gram. |
| 1.8 DMEA/0.1 DABCO | 0.8 gram | 0.4 gram | | 0.1 gram. |
| Trichloromonofluoromethane | 29.0 grams | 29.0 grams | 29.0 grams | 28.0 grams. |
| Mixing time at 850 r.p.m | 10 seconds | 10 seconds | 10 seconds | 10 seconds. |
| Cream time | 24 seconds | 27 seconds | 48 seconds | 45 seconds. |
| Set time | 55 seconds | 69 seconds | 90 seconds | 85 seconds. |
| Density of cured foam, pounds per cubic foot | 1.60 | 1.55 | 1.57 | 1.57. |
| Foam surface | Slight initial friability. | Slight initial friability. | Slight initial friability. | Slight initial friability. |
| Foam appearance | Good | Good | Good | Good. |
| Foam interior | Tough | Tough | Tough | Tough. |
| Primary shrinkage | Slight | Slight | Slight | Slight. |
| Percent expansion after 24 hours at 158° F. and high humidity | 2.7 | 1.6 | 0.78 | 0.39. |
| Percent expansion after 2 weeks at 158° F. and high humidity | 19.5 | 12.5 | 9.0 | 8.6. |
| Percent expansion after 48 hours at 200° F | 15.5 | 10.9 | 4.3 | 6.7. |

EXAMPLE XI

*Urea-ethylene oxide foams*

A polyol was prepared from 1 mole of urea and 5 moles of ethylene oxide according to the procedure outlined in Example V. The purified polyol had a hydroxyl number of 949.8, a moisture content of 0.094 percent by weight, and a nitrogen content of 8.65 percent by weight.

A rigid urethane foam blown with methylene chloride and carbon dioxide was prepared from a blend of 31 grams of the above polyol and 31 grams of the reaction product of 2 moles of a long chain dimer acid and 6 moles of trimethylolpropane having a hydroxyl number of 404 and a viscosity of 55,000 centipoises.

EXAMPLE XI.—TABLE 1

Foam XI-A

Ingredients:
- PAPI _____grams__ 100.0
- Blend of 50/50 urea-ethylene oxide polyol and long-chain dimer acid polyol __do____ 62.0
- Silicone emulsifier _____do____ 2.0
- Water _____do____ 2.2
- Methylene chloride _____do____ 19.8
- Hand mixing time _____seconds__ 10
- Set time _____do____ 45–50

The resulting foam rose satisfactorily and had a good cell structure. There was no initial shrinkage or distortion.

EXAMPLE XII

Rigid polyurethane foams were prepared from the following polyols: Control polyol (OH—780), N,N,N',N'-tetrakis(2-hydroxypropyl)ethylene diamine; Polyol A (OH—611), product of the reaction of 1 mole of urea with 4 moles of propylene oxide in the presence of 0.5 percent sulfuric acid at a temperature of about 230° F. to 240° F. and a pressure of about 55 pounds per square inch gauge in one stage; Polyol B (OH—598), similar to Polyol A; Polyol C (OH—594), the product of the reaction of 1 mole of urea with 4 moles of propylene oxide at a temperature of about 230° F. to 240° F. and a pressure of about 55 pounds per square inch gauge, and in the absence of any catalyst of reaction; Polyol D (OH—586), similar to Polyol C; Polyol E (OH—601), the product of the reaction of 1 mole of urea with 4 moles of propylene oxide at a temperature of about 260° F. to 270° F. and at a pressure of about 55 to 60 pounds per square inch gauge, and in the absence of any catalyst of reaction; Polyol F (OH—613), the product of the reaction of 1 mole of urea with 4 moles of propylene oxide at a temperature of about 230° F. to 245° F. under a pressure of about 80 to 85 pounds per square inch gauge, and in the absence of any catalyst of reaction; Polyol G (OH—604), similar to Polyol F; Polyol H (OH—604), prepared similar to Polyol F, although having a urea to propylene oxide ratio of 1 to 3.

Rigid polyurethane foams were prepared from the above polyols according to the following formulation.

EXAMPLE XII.—TABLE 1

| Ingredients | Control | Foam XII-A | Foam XII-B | Foam XII-C | Foam XII-D | Foam XII-E | Foam XII-F | Foam XII-G | Foam XII-H |
|---|---|---|---|---|---|---|---|---|---|
| PAPI (grams) | 100.0 | 100.0 | 100.0 | 100.0 | 100.0 | 100.0 | 100.0 | 100.0 | 100.0 |
| Polyol (grams) | 55.0 | 69.0 | 70.0 | 71.0 | 72.0 | 70.0 | 68.5 | 69.5 | 68.0 |
| Silicone emulsifier (grams) | 1.0 | 1.0 | 1.0 | 1.0 | 1.0 | 1.0 | 1.0 | 1.0 | 1.0 |
| Tetramethylbutanediamine (grams) | | 0.16 | 0.16 | 0.16 | 0.16 | 0.16 | 0.16 | 0.16 | 0.16 |
| Trichloromonofluoromethane (grams) | 25.5 | 25.4 | 25.5 | 25.5 | 25.8 | 25.5 | 25.3 | 25.5 | 25.3 |
| Mixing time at 850 r.p.m. (seconds) | 12 | 15 | 15 | 15 | 15 | 15 | 15 | 15 | 15 |
| Cream time (seconds) | | 43 | 45 | 40 | 43 | 43 | 43 | 45 | 45 |
| Set time (seconds) | 25 | 95 | 99 | 83 | 93 | 97 | 103 | 99 | 86 |
| Density, pounds per cubic foot | 1.69 | 1.67 | 1.67 | 1.67 | 1.67 | 1.67 | 1.67 | 1.67 | 1.67 |
| Time to burn 1 inch (seconds) | | 14 | 22 | 17 | 22 | 14 | 15 | 13 | 20 |
| Total burning time | | 54 | 64 | 60 | 73 | 60 | 65 | 67 | 44 |
| Total number of inches burned | (¹) | 3.2 | 3.7 | 2.4 | 3.4 | 3.5 | 3.5 | 3.8 | 1.9 |

¹ Completely consumed (more than 5 inches).

NOTE.—The above flame retardancy tests were conducted in accordance with ASTM-D-1692-59T procedure. According to that test, Foams XII-A through XII-H are characterized as self-extinguishing.

Although the nitrogen content of Foam XII Control (8.69 percent) and the nitrogen content of Foams XII-A through XII-H (8.64 percent) were almost identical, the flame retardancy was remarkably different. Foam XII Control was completely consumed when ignited in accordance with the procedures set forth in ASTM-D-1692-59T, while Foams XII-A through XII-H were all self-extinguishing according to the ASTM procedure.

ASTM-D-1692-59T procedure involves igniting one end of a 2 inch by 6 inch by ½ inch foam specimen with a Bunsen burner having a wing-top producing a 1½ inch high flame. The specimen has marks at 1 inch and 5 inches from the ignited end. The flame of the burner is held to the end of the foam for 1 minute and then removed. If the 1 inch mark is not reached at the end of 1 minute, the specimen is considered non-burning. If the foam ceases to burn before reaching the 5-inch mark, the specimen is considered self-extinguishing.

EXAMPLE XIII

To illustrate another method of preparing novel N-containing polyols which produce self-extinguishing foams when reacted with an organic polyisocyanate, one molar equivalent of urea was reacted with one molar equivalent of triisopropanolamine, and this reaction product was further reacted with one molar equivalent of propylene oxide to produce Polyol A and with two molar equivalents of propylene oxide to produce Polyol B. The following procedures were utilized.

Polyol XIII-A

About 1335 grams (7.0 moles) of triisopropanolamine were charged to a reaction vessel equipped with a reflux condenser and nitrogen inlet. As the triisopropanolamine was heated, the urea was added incrementally until 420 grams (7.0 moles) of urea had been added. The temperature of the reaction was maintained at about 125° C. to 130° C. The reaction was continued for a period of about 7 hours. The reaction product had a hydroxyl value of about 710, an amine equivalent of 205, a nitrogen content of 13.24 percent, and a free urea content of 6.67 percent.

About 1140 grams (4.87 moles) of the above reaction product were reacted with 283 grams (4.87 moles) of propylene oxide. The reaction product was charged to a preheated reactor having an external recirculating line connected to a heat exchanger, and heated to 220° F. The propylene oxide was added incrementally over a 15-minute period. The reaction was continued for about 6 hours at a temperature of about 220° C. to about 230° C. The maximum pressure attained in the reactor was about 50 pounds per square inch gauge, and the completion of reaction was indicated by the diminishing pressure.

The crude product from the alkylene oxide reaction was vacuum distilled for about 2 hours at a maximum temperature of about 100° C. and a pressure of about 10 millimeters of mercury. The final reaction product (Polyol A) had a Brookfield viscosity at 77° F. of 26,900 centipoises and an alkalinity value of 0.43, a free urea content of 3.40 percent, a hydroxyl value of 680.9, a moisture content of 0.053 percent, an amine equivalent of 229, and a nitrogen content of 10.87 percent.

Polyol XIII-B

About 1673 grams (8.8 moles) of triisopropanolamine were reacted with 527 grams (8.8 moles) of urea in a manner similar to that set forth for Polyol A. The reaction product had a hydroxyl value of 712, an amine equivalent of 205, a nitrogen content of 13.4 percent, and a free urea content of 6.18 percent.

An alkylene oxide derivative of the above reaction product was prepared by reacting about 1270 grams (5.43 moles) of the above reaction product with about 630 grams (10.86 moles) of propylene oxide. The reaction was conducted by charging the reaction product to a preheated reactor and heating to about 220° F. Propylene oxide was added incrementally over a period of about 4 hours. The reaction temperature was maintained at about 220° F. to 240° F. and the maximum pressure reached during the reaction was about 60 pounds per square inch gauge. The reaction was continued for a period of about 7 hours. The alkylene oxide reaction product was vacuum distilled at a maximum temperature of about 100° C. for a period of about 1 hour and 15 minutes under a pressure of about 11 millimeters of mercury.

The final reaction product (Polyol B) had a Brookfield viscosity at 77° F. of 14,750 centipoises, a hydroxyl value of 724.8, a nitrogen content of 9.80 percent, an amine equivalent of 234.6, and a free urea content of 3.22 percent.

The above polyhydroxy resinous materials, Polyol XIII-A and Polyol XIII-B, were reacted with an organic polyisocyanate according to the following formulations to form polyurethane foams.

EXAMPLE XIII.—TABLE 1

| Ingredients | Foam XIII-A | Foam XIII-B |
| --- | --- | --- |
| Polymethylene polyphenyl isocyanate (PAPI), grams. | 100.0 | |
| Diphenylmethane-4,4'-diisocyanate (Mondur-MR), grams. | | 100.0 |
| Polyol A, grams | 62.0 | |
| Polyol B, grams | | 58.0 |
| Silicone emulsifier, gram | 1.0 | 1.0 |
| Tetramethylbutanediamine, milliliter | 0.5 | 0.5 |
| Trichloromonofluoromethane, grams | 24.5 | 24.0 |
| Mixing time at 850 r.p.m. (mechanical stirrer), seconds. | 20 | 20 |
| Cream time, seconds | 25–30 | 25–30 |
| Set time, seconds | 35–40 | 50–55 |
| Density, pounds per cubic foot | 2.01 | 2.0 |

Foam XIII-A was tested according to flame retardant test ASTM-D-1692-59T. The foam burned 1 inch in 12 seconds and self-extinguished in 50 seconds. A total of 2¾ inches of the foam was consumed by the burning.

Foam XIII-B was also tested for flame retardancy and burned 1 inch in 14 seconds and self-extinguished in 40 seconds. A total of 2 inches of the foam was consumed in burning.

Both of the foams are considered self-extinguishing according to the standards set forth is ASTM-D-1692-59T.

Similar results are obtained when triethanolamine is substituted for triisopropanolamine in the above example.

*Comparison tests*

To illustrate the unique properties of the above foams, it was attempted to prepare a foam by reacting an organic polyisocyanate with the reaction product of an aliphatic polyol, such as trimethylolpropane, and urea. One mole of trimethylolpropane (TMP) was reacted with 1 mole of urea in a manner similar to that set forth in Example XIII for the reaction of triisopropanolamine and urea. The trimethylolpropane-urea reaction product had a hydroxyl number of 735, a nitrogen content of 8.57 percent, an amine equivalent of 1760, and a urea content of 5.24 percent.

The urea-trimethylolpropane reaction product was reacted with polymethylene polyphenyl isocyanate in the presence of 23.8 grams of trichloromonofluoromethane and 0.2 milliliter of tetramethylbutanediamine. No foam resulted.

Similarly, it was attempted to prepare a foam from the reaction product of triisopropanolamine (1 mole) and urea (1 mole). The reaction as conducted above in Example XIII resulted in a polyhydroxy material having a hydroxyl number of 710, a nitrogen content of 13.24 percent, an amine equivalent of 205, and a free urea content of 6.67 percent. The reaction of this product with polymethylene polyphenyl isocyanate in the presence of 24 grams of trichloromonofluoromethane and 1.0 milliliter of tetramethylbutanediamine did not result in a foam.

EXAMPLE XIV

A polyurethane foam was prepared from the reaction product of 1 mole of urea and 2 moles of propylene oxide which had a hydroxyl value of 838 and a Brookfield viscosity at 77° F. of 9030 centipoises. About 8.1 grams of this material and 2.0 grams of the reaction product of a long chain dimer acid (2 moles) and trimethylolpropane (6 moles) having a hydroxyl value of 403.6 were reacted with 20 grams of polymethylene polyphenyl isocyanate in the presence of 0.2 gram of a silicone emulsifier, 0.15 gram of an 8.0 percent copper naphthenate solution, 0.1 milliliter of tetramethylbutanediamine and 4.7 grams of trichloromonofluoromethane. The ingredients were hand-mixed for 40 seconds at a set time of about 90 seconds.

The resulting foam did not exhibit any shrinkage after 24 hours.

EXAMPLE XV

Polyurethane foams were prepared from a reaction product of 1 mole of urea and 4 moles of 1,2-butylene oxide having a hydroxyl value of 614. The following table sets forth the proportions of the ingredients utilized in the preparation of these polyurethane foams.

EXAMPLE XV.—TABLE 1

| Ingredients | Foam XV-A | Foam XV-B |
| --- | --- | --- |
| Polymethylene polyphenyl isocyanate, grams | 100.0 | |
| Crude toluene diisocyanate, grams | | 100.0 |
| Urea-butylene oxide polyol, grams | 69.0 | 85.0 |
| Silicone emulsifier, gram | 1.0 | 1.0 |
| Trichloromonofluoromethane, grams | 25.5 | 28.0 |
| Mixing time (mechanical mixer), seconds | 15 | 8 |
| Cream time, seconds | 28 | 17 |
| Set time, seconds | 55 | 43 |

Foam XV-A had good appearance, fine cell structure and a density of 1.95 pounds per cubic foot. The foam was tough and had only slight surface friability.

Foam XV-B had good appearance, fine cell structure and a density of 2.11 pounds per cubic foot. The foam was fairly tough and had moderate surface friability.

In the above examples, similar results are achieved when dichlorodifluoromethane is substituted for trichloromonofluoromethane.

Although the above examples depict the invention in detail, the invention is not to be construed as limited solely thereto, but to include all the embodiments set forth in the following claims.

We claim:
1. A polyurethane resin prepared from reactants consisting essentially of:
   (a) an organic polyisocyanate, and
   (b) a carbamate of the structure

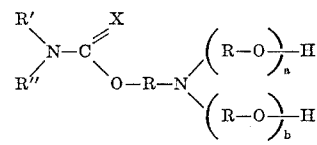

wherein X is selected from the class consisting of oxygen and sulfur, each R is a 1,2-alkylene radical containing from 2 to 10 carbon atoms, R' and R" are selected from the class consisting of hydrogen atoms, alkyl radicals, aryl radicals, alkylphenyl radicals, and

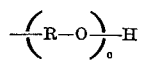

groups, where R, R' and R'' may be the same or different, and $a$, $b$, and $c$ represent a number from 0 to 10, and $a+b+c$ is from 1 to 10.

2. A cellular polyurethane resin prepared from reactants consisting essentially of:
(a) an organic polyisocyanate, and
(b) a carbamate of the structure

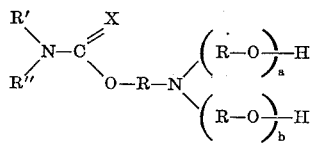

wherein X is selected from the class consisting of oxygen and sulfur, each R is a 1,2-alkylene radical containing from 2 to 10 carbon atoms, R' and R'' are selected from the class consisting of hydrogen atoms, alkyl radicals, aryl radicals, alkylphenyl radicals, and

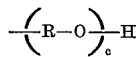

groups, where R, R' and R'' may be the same or different, and $a$, $b$, and $c$ represent a number from 0 to 10, and $a+b+c$ is from 1 to 10,
in the presence of a blowing agent.

3. The cellular polyurethane resin of claim 2 wherein the blowing agent is a halocarbon.

4. The cellular polyurethane resin of claim 2 wherein $a+b+c$ is from 2.7 to 7.55.

5. A polyurethane resin prepared from reactants consisting essentially of:
(a) an organic polyisocyanate,
(b) a carbamate of the structure

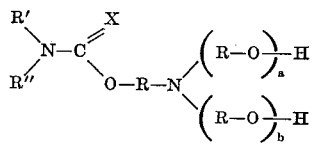

wherein X is selected from the class consisting of oxygen and sulfur, each R is a 1,2-alkylene radical containing from 2 to 10 carbon atoms, R' and R'' are selected from the class consisting of hydrogen atoms, alkyl radicals, aryl radicals, alkylphenyl radicals, and

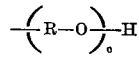

groups, where R, R' and R'' may be the same or different, and $a$, $b$, and $c$ represent a number from 0 to 10, and $a+b+c$ is from 1 to 10, and
(c) wherein there is present a member of the class consisting of a polyether polyol other than a carbamate, and a polyester of a dicarboxylic acid and a polyol.

References Cited
UNITED STATES PATENTS

| | | | |
|---|---|---|---|
| 2,091,106 | 8/1937 | Piggott | 260—553 |
| 2,123,718 | 7/1938 | De Groote | 260—553 XR |
| 2,352,552 | 5/1944 | Kienzle | 260—2 |
| 3,038,008 | 6/1962 | Richter | 260—553 |
| 3,277,027 | 10/1966 | Hennig et al. | 260—2.5 |

FOREIGN PATENTS

| | | |
|---|---|---|
| 804,300 | 11/1958 | Great Britain. |
| 861,045 | 2/1961 | Great Britain. |
| 981,687 | 1/1965 | Great Britain. |
| 1,160,173 | 12/1963 | Germany. |

DONALD E. CZAJA, *Primary Examiner.*

LEON J. BERCOVITZ, *Examiner.*

C. W. IVY, *Assistant Examiner.*